United States Patent
Park et al.

(10) Patent No.: US 11,638,232 B2
(45) Date of Patent: *Apr. 25, 2023

(54) TERMINAL PERFORMING REGISTRATION IN NON-3GPP ACCESS AND METHOD PERFORMED BY SAME

(71) Applicant: LG ELECTRONICS INC., Seoul (KR)

(72) Inventors: Sangmin Park, Seoul (KR); Jaehyun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/943,937

(22) Filed: Sep. 13, 2022

(65) Prior Publication Data

US 2023/0007614 A1    Jan. 5, 2023

Related U.S. Application Data

(63) Continuation of application No. 17/274,253, filed as application No. PCT/KR2019/012504 on Sep. 26, 2019, now Pat. No. 11,457,425.

(30) Foreign Application Priority Data

Sep. 28, 2018  (KR) .................. 10-2018-0116377

(51) Int. Cl.
*H04W 60/06* (2009.01)
*H04W 8/02* (2009.01)
*H04W 28/02* (2009.01)

(52) U.S. Cl.
CPC ............ *H04W 60/06* (2013.01); *H04W 8/02* (2013.01); *H04W 28/0289* (2013.01)

(58) Field of Classification Search
CPC . H04W 60/00; H04W 28/0289; H04W 76/18; H04W 48/16; H04W 60/06;
(Continued)

(56) References Cited

U.S. PATENT DOCUMENTS

| 2012/0039313 A1 | 2/2012 | Jain |
| 2019/0174449 A1* | 6/2019 | Shan ............... H04W 60/00 |
| 2021/0360569 A1 | 11/2021 | Park et al. |

FOREIGN PATENT DOCUMENTS

| EP | 2451228 | 5/2012 | |
| EP | 2451228 A1 * | 5/2012 | ............ H04W 28/02 |

(Continued)

OTHER PUBLICATIONS

PCT International Application No. PCT/KR2019/012504, International Search Report dated Jan. 7, 2020, 4 pages.

(Continued)

*Primary Examiner* — Dung Hong
(74) *Attorney, Agent, or Firm* — Lee Hong Degerman Kang Waimey

(57) ABSTRACT

One disclosure of the present specification provides a method performed by a terminal that performs registration in a non-3rd generation partnership project (3GPP) access. According to the method, the terminal may receive a rejection message including a value of a back-off timer. In addition, the terminal may determine a value of a non-3GPP de-registration timer on the basis of the value of the back-off timer. In this case, the value of the non-3GPP de-registration timer may be determined to be greater than the value of the back-off timer.

15 Claims, 17 Drawing Sheets

(58) Field of Classification Search
CPC ..... H04W 48/02; H04W 60/04; H04W 48/18; H04W 84/042; H04W 8/02
See application file for complete search history.

(56) References Cited

FOREIGN PATENT DOCUMENTS

| | | | |
|---|---|---|---|
| EP | 2487954 | 8/2012 | |
| EP | 2487954 A2 * | 8/2012 | ............ H04W 28/02 |
| WO | 2018008944 | 1/2018 | |

OTHER PUBLICATIONS

ZTE, "Non-3GPP de-registration timer," 3GPP TSG-CT WG1 Meeting #112, C1-185084, Aug. 2018, 5 pages.
Qualcomm Incorporated, "Clarification for the non-3GPP deregistration timer," 3GPP TSG-CT WG1 Meeting #111, C1-183211, May 2018, 4 pages.
LG Electronics, "Implicit de-registration over non-3GPP access," 3GPP TSG-CT WG1 Meeting #109, C1-181376, Mar. 2018, 15 pages.
ZTE, "Non-3GPP deregistration timer," 3GPP TSG-CT WG1 Meeting #105, C1-172905, Aug. 2017, 4 pages.
United States Patent and Trademark Office U.S. Appl. No. 17/274,253, Office Action dated Mar. 24, 2022, 12 pages.
United States Patent and Trademark Office U.S. Appl. No. 17/274,253, Notice of Allowance dated May 20, 2022, 8 pages.
3GPP TS 24.501 Version 15.0.0 Release 15, Jul. 2018 (Year: 2018), 337 pages.

* cited by examiner

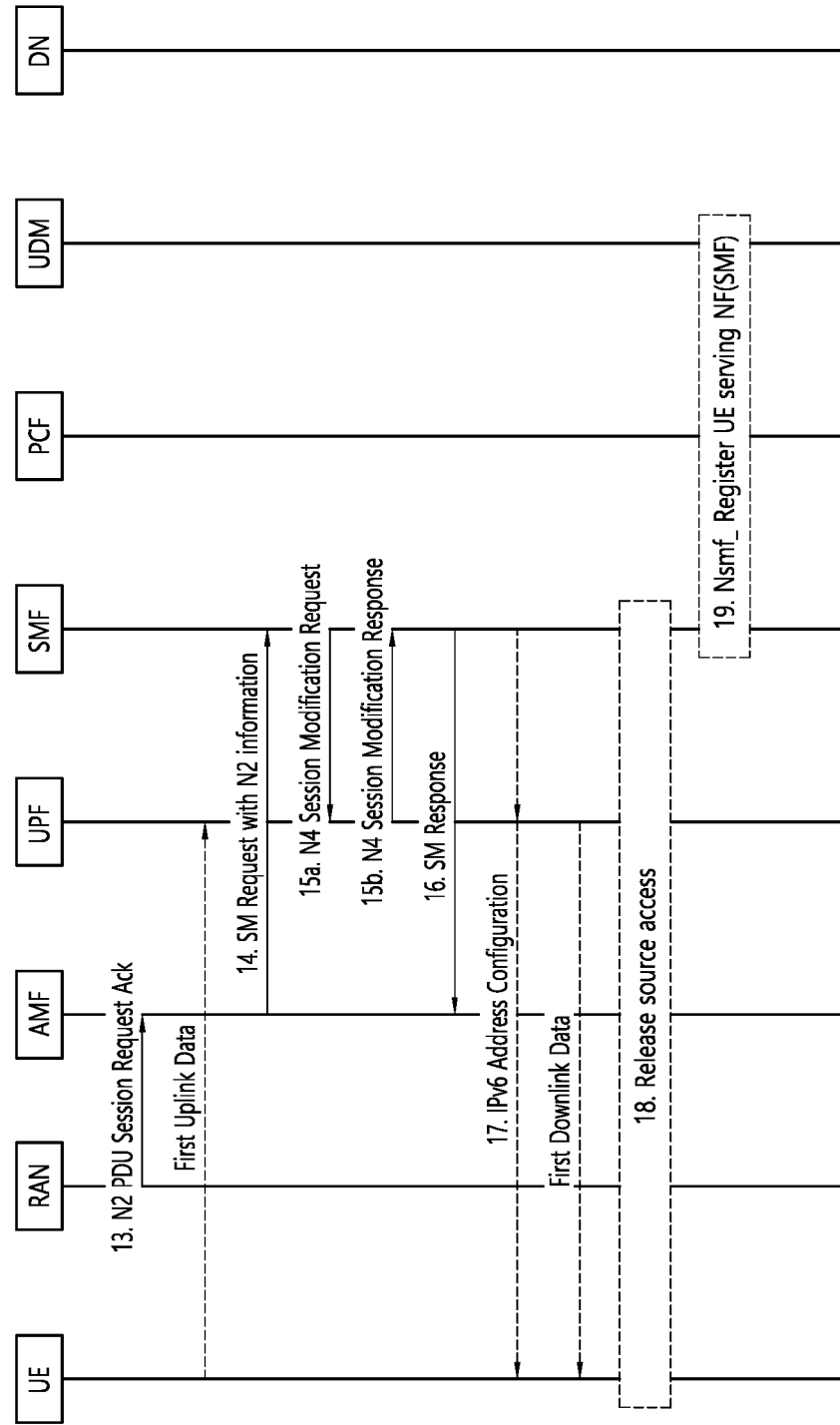

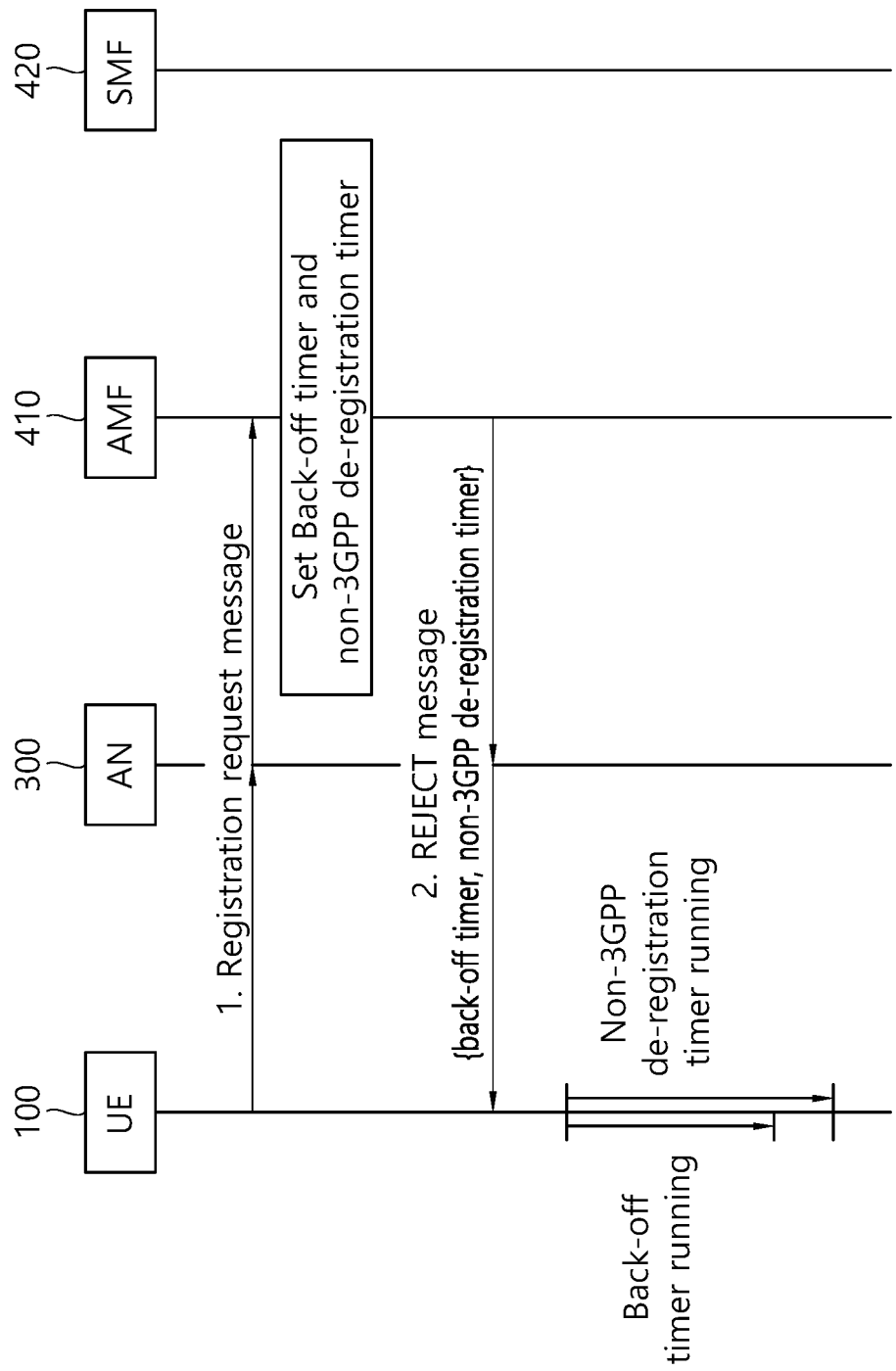

TERMINAL PERFORMING REGISTRATION IN NON-3GPP ACCESS AND METHOD PERFORMED BY SAME

CROSS-REFERENCE TO RELATED APPLICATIONS

This application is a continuation of U.S. patent application Ser. No. 17/274,253, filed on Mar. 8, 2021, which is the National Stage filing under 35 U.S.C. 371 of International Application No. PCT/KR2019/012504, filed on Sep. 26, 2019, which claims the benefit of earlier filing date and right of priority to KR Application No. 10-2018-0116377, filed on Sep. 28, 2018, the contents of which is incorporated by reference herein in its entirety.

TECHNICAL FIELD

The present specification relates to next-generation mobile communications, e.g., 5G mobile communications.

BACKGROUND

With the success of long term evolution (LTE)/LTE-Advanced (LTE-A) for the fourth-generation mobile communication, the next generation mobile communication, which is the fifth-generation (so called 5G) mobile communication, has been attracting attentions and more and more researches are being conducted.

The fifth-generation communication defined by the international telecommunication union (ITU) refers to providing a maximum data transmission speed of 20 Gbps and a maximum transmission speed of 100 Mbps per user in anywhere. It is officially called "IMT-2020" and aims to be released around the world in 2020.

The fifth-generation mobile communication supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

NR frequency band is defined as a frequency range of two types, i.e., FR1, FR2. FR1 is 410 MHz-7125 MHz, and FR2 is 24250 MHz-52600 MHz, meaning millimeter wave (mmW).

The ITU suggests three usage scenarios, for example, enhanced mobile broadband (eMBB), massive machine type communication (mMTC), and ultra-reliable and low latency communications (URLLC).

URLLC relates to a usage scenario in which high reliability and low delay time are required. For example, services like autonomous driving, automation, and virtual realities requires high reliability and low delay time (e.g., 1 ms or less). A delay time of the current 4G (LTE) is statistically 21-43 ms (best 10%), 33-75 ms (median). Thus, the current 4G (LTE) is not sufficient to support a service requiring a delay time of 1ms or less.

Next, the eMBB relates to a usage scenario that requires a mobile ultra-wideband.

These ultra-wideband high-speed services seem to be difficult to accommodate by existing core networks designed for LTE/LTE-A.

Therefore, the redesign of core networks is urgently needed in so-called fifth-generation mobile communications.

FIG. 1 is a structural diagram of a next-generation mobile communication network.

The 5G core network (5GC) may include various components, part of which are shown in FIG. 1, including an access and mobility management function (AMF) 41, a session management function (SMF) 42, a policy control function (PCF) 43, a user plane function (UPF) 44, an application function (AF) 45, a unified data management (UDM) 46 and a non-3GPP interworking function (N3IWF) 49.

A UE 10 is connected to a data network via the UPF 44 through a next generation radio access network (NG-RAN).

The UE 10 may be provided with a data service even through untrusted non-3GPP access, e.g., a wireless local area network (WLAN). In order to connect the non-3GPP access to a core network, the N3IWF 59 may be deployed.

FIG. 2 is an exemplary diagram illustrating a predicted structure of a next generation mobile communication in terms of a node.

Referring to FIG. 2, the UE is connected to a data network (DN) through a next generation radio access network (NG0RAN).

The control plane function (CPF) node as shown may perform all or part of the mobility management entity (MME) function of the fourth generation mobile communication, and all or a part of the control plane function of the serving gateway (S-GW) and the PDN-gateway (P-GW) of the fourth generation mobile communication. The CPF node includes an access and mobility management Function (AMF) node and a session management function (SMF).

The user plane function (UPF) node as shown is a type of a gateway over which user data is transmitted and received. The UPF node may perform all or part of the user plane functions of the S-GW and the P-GW of the fourth generation mobile communication.

The policy control function (PCF) node as shown is configured to control a policy of the service provider.

The application function (AF) node as shown refers to a server for providing various services to the UE.

The unified data management (UDM) node as shown refers to a type of a server that manages subscriber information, such as a home subscriber server (HSS) of 4th generation mobile communication. The UDM node stores and manages the subscriber information in the Unified Data Repository (UDR).

The authentication server function (AUSF) node as shown authenticates and manages the UE.

The network slice selection function (NSSF) node as shown refers to a node for performing network slicing as described below.

In FIG. 2, a UE can simultaneously access two data networks using multiple protocol data unit (PDU) sessions.

FIG. 3 is an exemplary diagram illustrating an architecture for supporting simultaneously access two data networks.

FIG. 3 illustrates an architecture that allows the UE to simultaneously access two data networks using one PDU session.

Reference points shown in FIGS. 2 and 3 are as follows.
N1 is a reference point between UE and AMF.
N2 is a reference point between (R)AN and AMF.
N3 is a reference point between (R)AN and UPF.
N4 is a reference point between SMF and UPF.
N5 is a reference point between PCF and AF.
N6 is a reference point between UPF and DN.
N7 is a reference point between SMF and PCF.
N8 is a reference point between UDM and AMF.

N9 is a reference point between UPFs.

N10 is a reference point between UDM and SMF.

N11 is a reference point between AMF and SMF.

N12 is a reference point between AMF and AUSF.

N13 is a reference point between UDM and AUSF.

N14 is a reference point between AMFs.

N15 is a reference point between PCF and AMF.

N16 is a reference point between SMFs.

N22 is a reference point between AMF and NSSF.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC) layer. The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The non-access stratum (NAS) layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.

Registration management and access management procedures. AMF supports the following functions.

Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

Network systems (i.e., 5GC) for next-generation mobile communications (i.e., 5G) also support non-3GPP access. An example of the non-3GPP access is WLAN access. The WLAN access may include both trusted and untrusted WLANs.

In systems for 5G, AMF performs registration management (RM) and connection management (CM) for non-3GPP access as well as 3GPP access.

However, in a network congestion situation, there may be a problem that UEs registered via non-3GPP access may be unnecessarily unregistered.

SUMMARY

Therefore, the disclosure of the present specification is intended to address the above-mentioned problems.

To achieve the above-mentioned objectives, an aspect of the present specification provides a method performed by a user equipment which has performed a registration in a non-3rd generation partnership project (3GPP) access. According to the above method, the UE may receive a reject message including a value of a back-off timer. The UE may determine a value of a non-3GPP de-registration timer based on the value of the back-off timer. The value of the non-3GPP de-registration timer may be determined to be greater than the value of the back-off timer.

To achieve the above-mentioned objectives, an aspect of the present specification also provides a user equipment which has performed a registration in a non-3rd generation partnership project (3GPP) access. The UE may include a transceiver configured to receive a reject message including a value of a back-off timer. The UE may include a processor configured to determine a value of a non-3GPP de-registration timer based on the value of the back-off timer. The value of the non-3GPP de-registration timer may be determined to be greater than the value of the back-off timer.

According to the disclosure of the present specification, existing problems can be resolved.

BRIEF DESCRIPTION OF THE DRAWINGS

FIGS. 6a and 6b are a signal flowchart illustrating an exemplary PDU session establishment procedure.

FIG. 7 is an exemplary diagram illustrating a flowchart according to a first disclosure.

DETAILED DESCRIPTION

Figure 1:
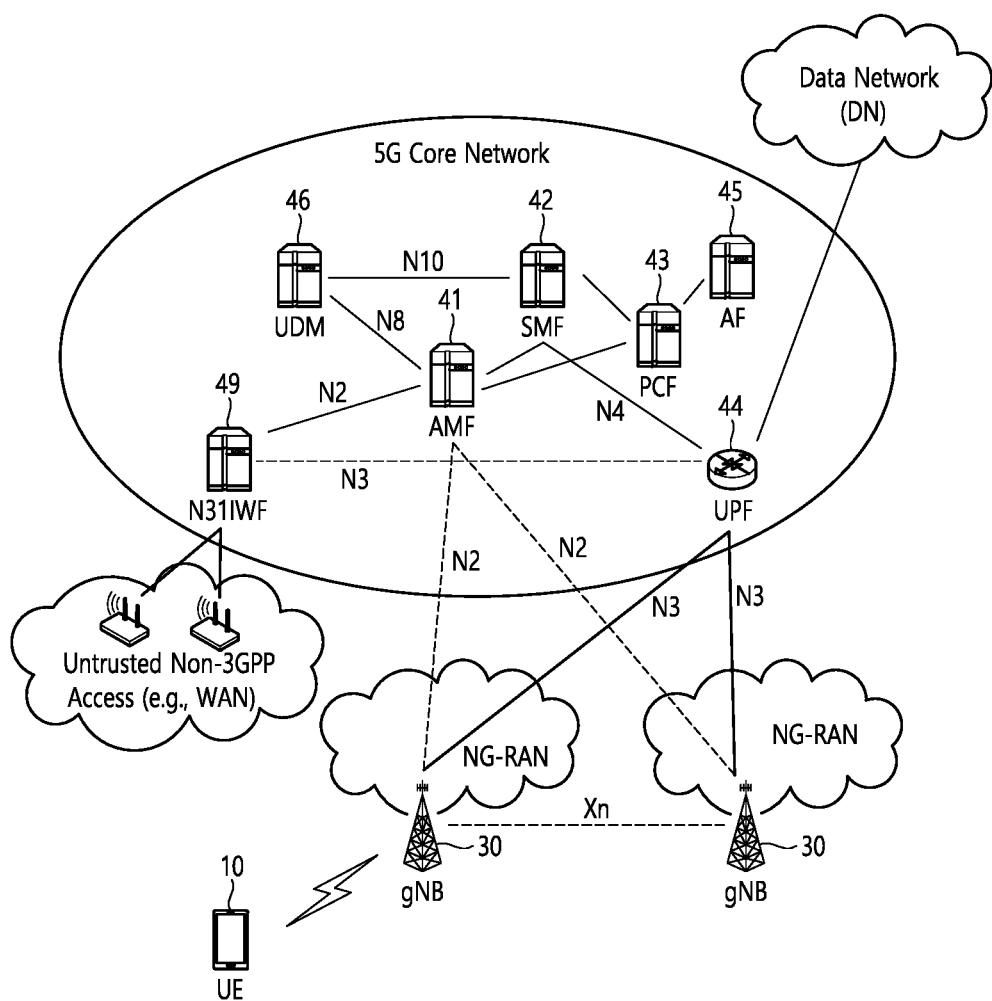
FIG. 1 is a structural diagram of a next-generation mobile communication network.
Figure 2:
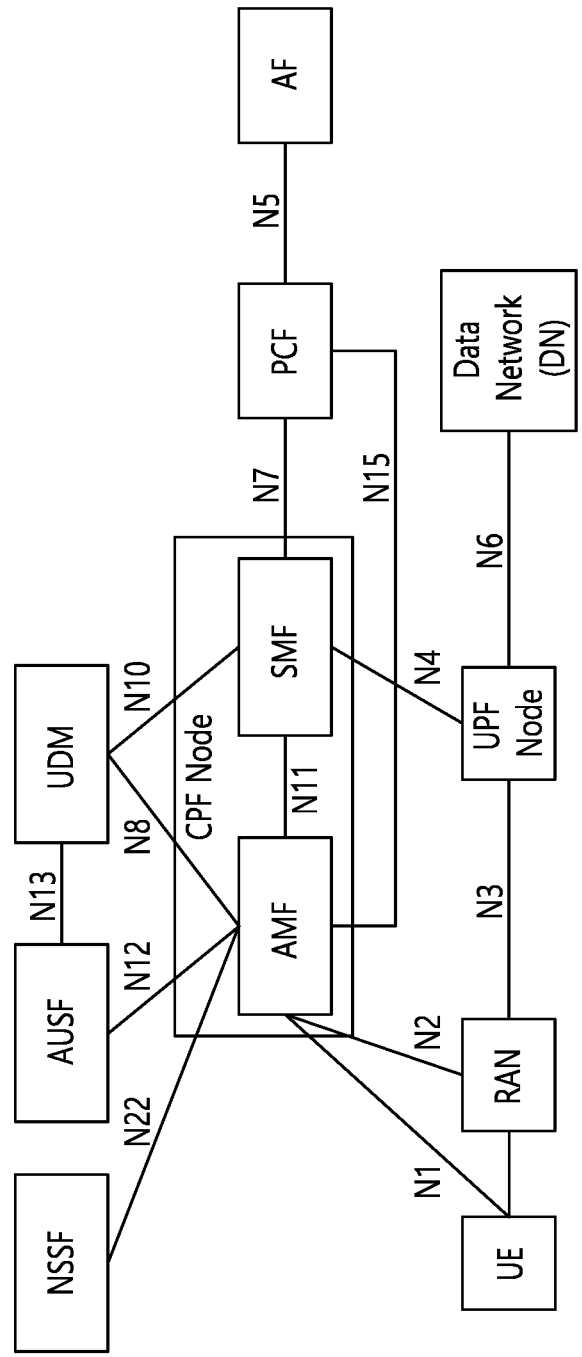
FIG. 2 is an exemplary diagram illustrating a predicted structure of a next generation mobile communication in terms of a node.
Figure 3:
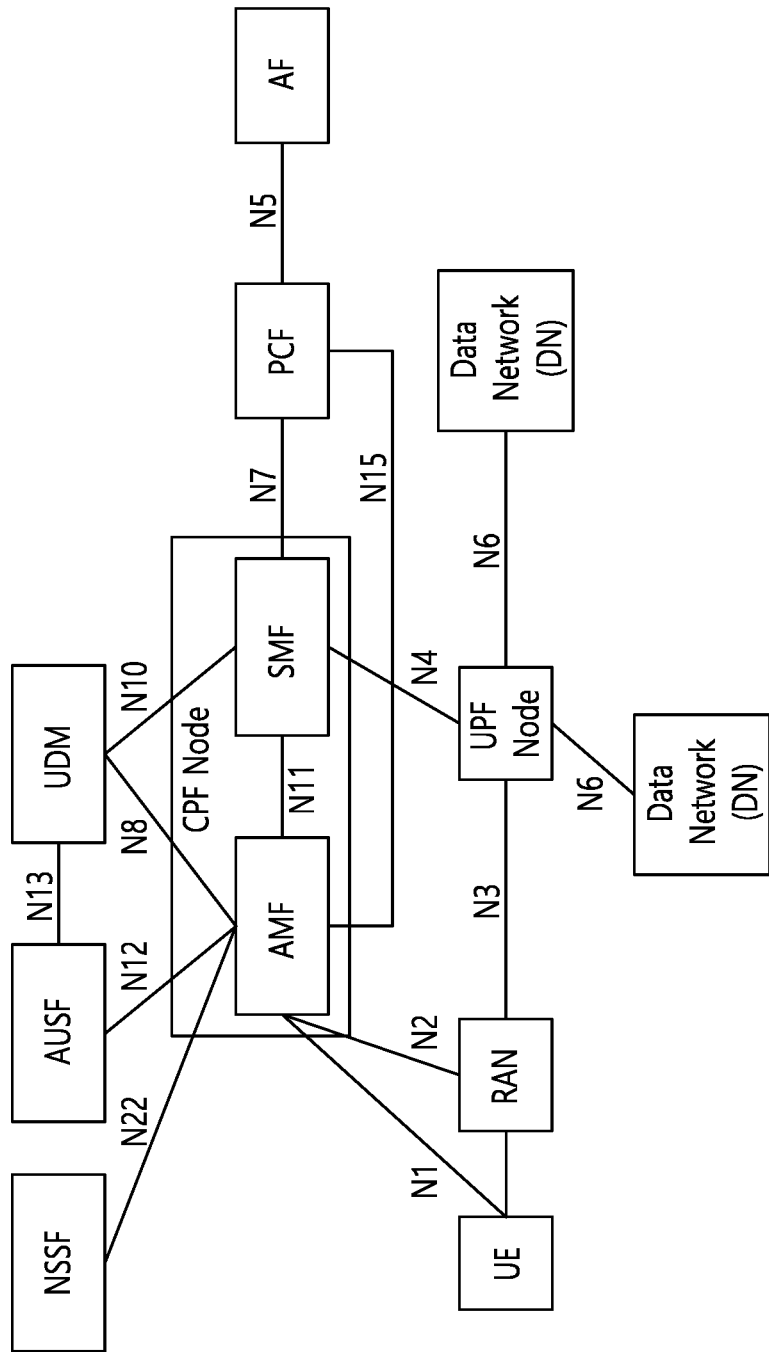
FIG. 3 is an exemplary diagram illustrating an architecture for supporting simultaneously access two data networks.
Figure 4:
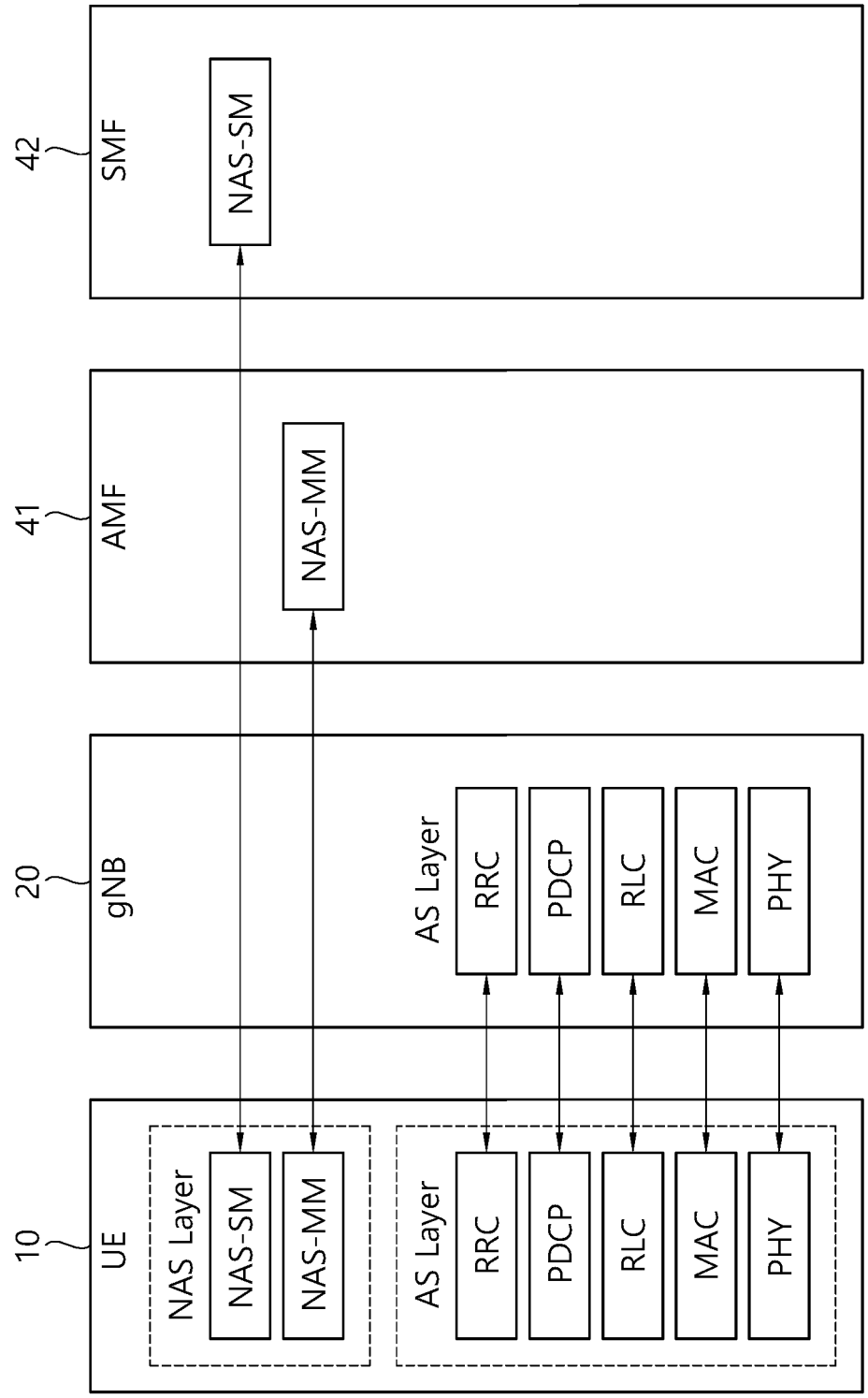
FIG. 4 is another exemplary diagram showing a structure of a radio interface protocol between a UE and a gNB.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

<Definition of Terms>

Before describing the present disclosure with reference to the accompanying drawings, terms used in the present disclosure will be briefly defined in order to help understanding of the present disclosure.

UE/MS: User equipment/mobile station, which refers to a UE 100 device.

EPS: An acronym for evolved packet system, which refers to a core network supporting a long term evolution (LTE) network. Network in the form of evolved UMTS PDN (public data network): An independent network in which a server providing services is located PDN-GW (packet data network gateway): A network node of an EPS network that performs functions of UE IP address allocation, packet screening & filtering, and charging data collection.

Serving GW (serving gateway): A network node of the EPS network that performs mobility anchor, packet routing, idle mode packet buffering, and triggering MME to page UE functions eNodeB: A base station of an EPS installed outdoors, and a cell coverage scale corresponds to a macro cell.

MME: An acronym for mobility management entity and serves to control each entity within the EPS to provide session and mobility for a UE.

Session: A session is a path for data transmission, and its unit may be a PDN, a bearer, an IP flow unit, etc. Each unit may be classified into an entire target network unit (APN or PDN unit) as defined in 3GPP, a unit classified by QoS (bearer unit) therein, and a destination IP address unit.

APN: An acronym for access point name, which is provided to a UE as the name of an access point managed by a network. In other words, it is a character string that refers to or identifies a PDN. In order to access a requested service or network (PDN), the requested service or the network is accessed through a corresponding P-GW, and the APN is a name (character string) predefined in the network so that this P-GW may be found. For example, the APN may be in the form of internet.mnc012.mcc345.gprs.

PDN connection: It indicates a connection from the UE to the PDN, that is, an association (connection) between the UE expressed by an ip address and the PDN expressed by the APN. This refers to a connection between entities (UE 100-PDN GW) in a core network so that a session may be formed.

UE Context: Context information of the UE used to manage the UE in the network, that is, context information including a UE id, mobility (current location, etc.), and session properties (QoS, priority, etc.)

NAS (non-access-stratum): An upper stratum of a control plane (control plane) between the UE and an MME. It supports mobility management between the UE and the network, session management, and IP address maintenance PLMN: An abbreviation for public land mobile network, which refers to the operator's network identification number. In a roaming situation of the UE, PLMN is classified into a home PLMN (HPLMN) and a visited PLMN (VPLMN).

DNN: An acronym for data network name. It is provided to the UE as the name of an access point managed by the network, similar to the APN. In 5G systems, DNN is used equivalent to APN.

NSSP (Network Slice Selection Policy): Used by UEs for mapping applications and

Single Network Slice Selection Assistance Information (S-NSSAI).

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system. Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 5A:
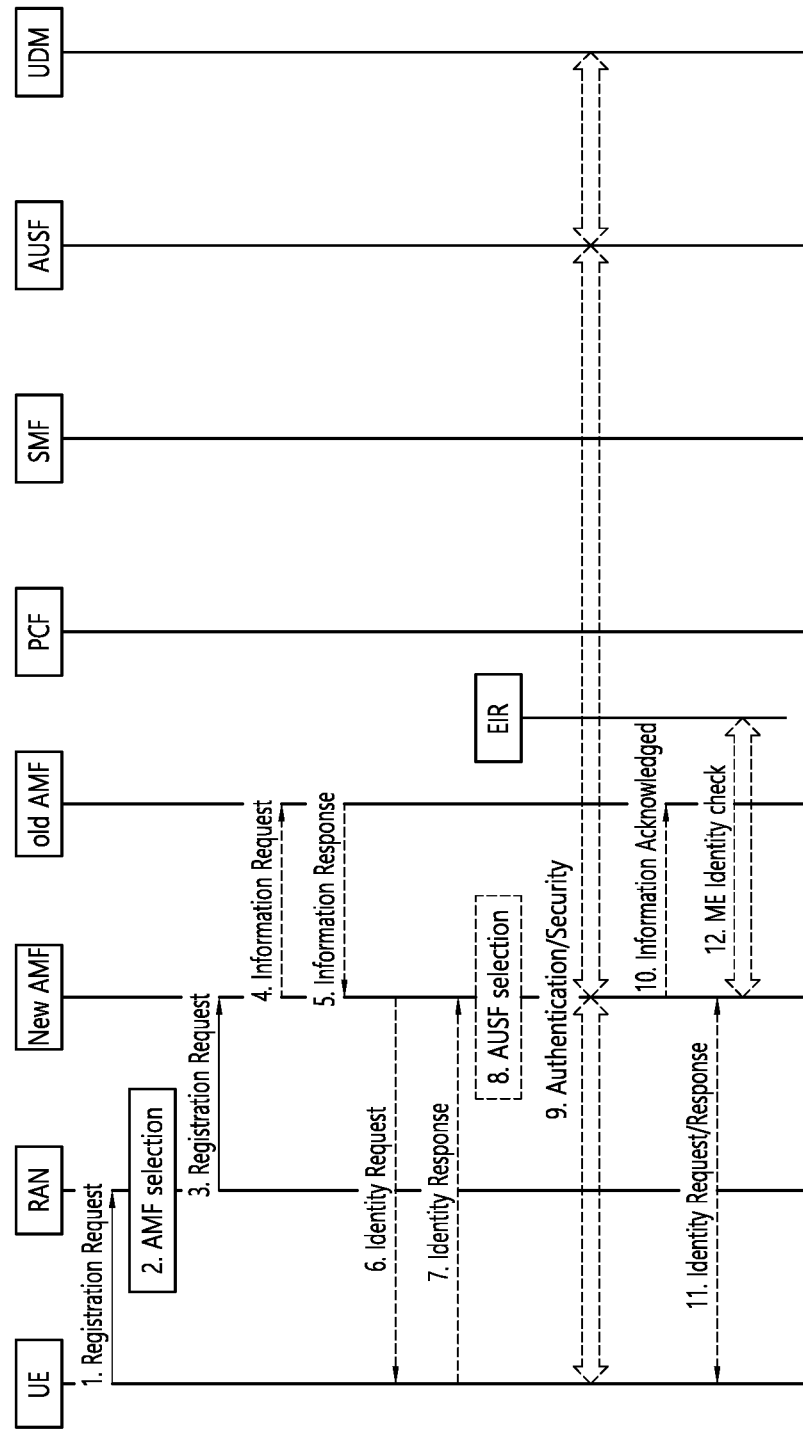
FIGS. 5a and 5b are a signal flowchart illustrating an exemplary registration procedure.
Figure 5B:
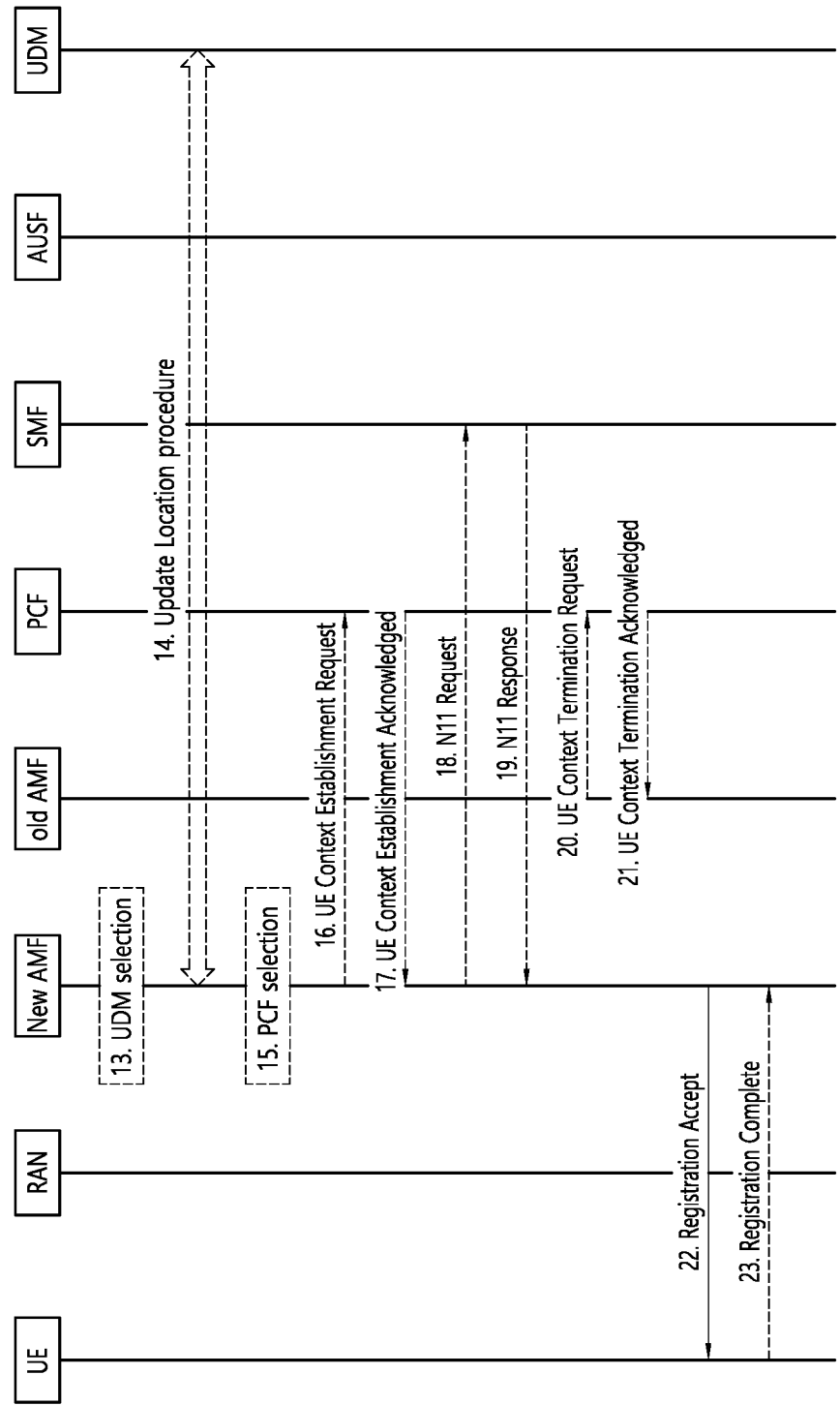

FIGS. 5a and 5b are a signal flowchart illustrating an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NSSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information on the allowed NSSAI and the mapped NSSAI. The information on the allowed NSSAI information for the UE's access type may be contained within N2 messages containing the registration accept message. The information on the mapped NSSAI is information for mapping each S-NSSAI of the allowed NSSAI to the S-NASSI of the NSSAI set up for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
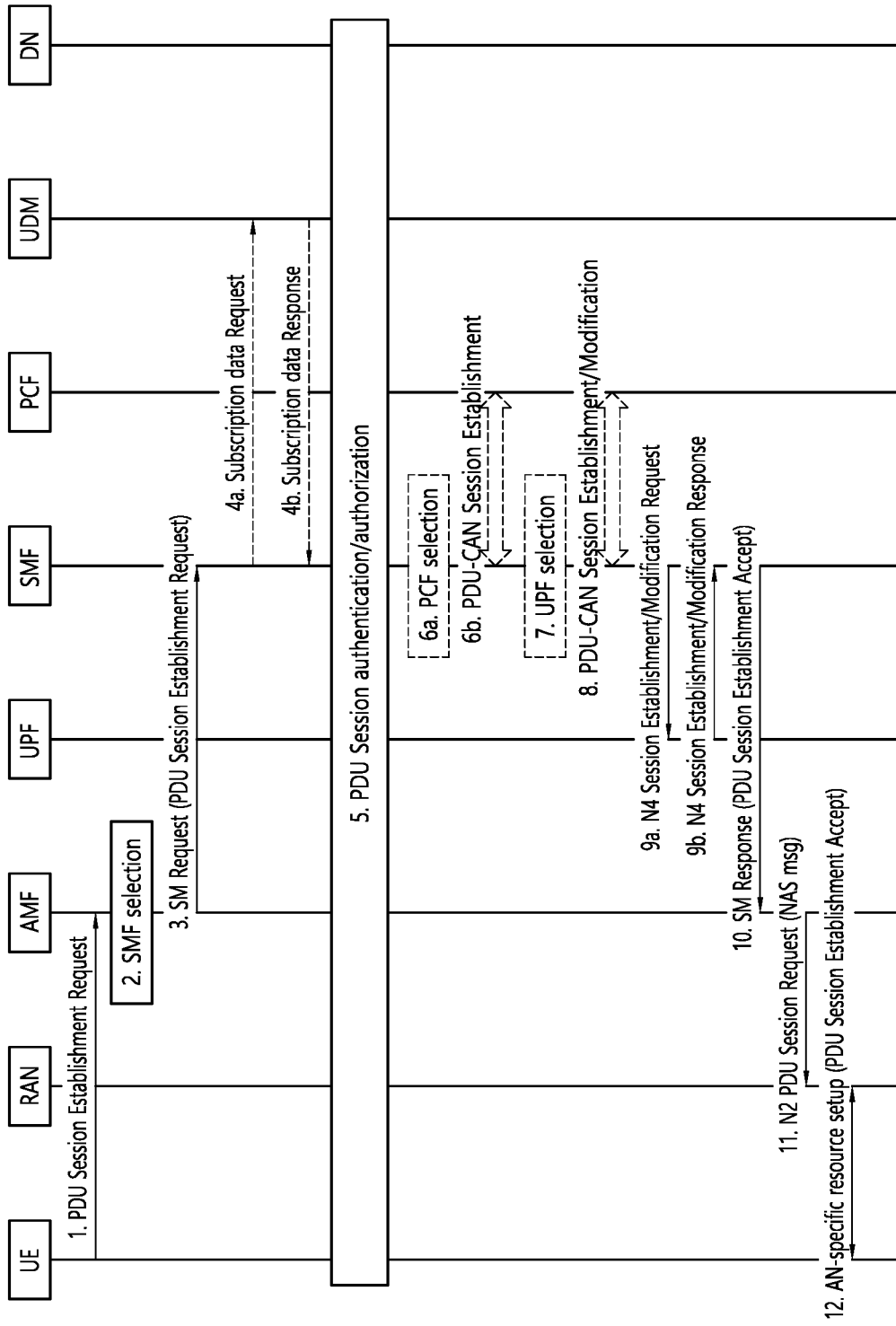

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information, and so on.

Specifically, the UE includes S-NSSAI from allowed NSSAI for the current access type. If information on the mapped NSSAI has been provided to the UE, the UE may provide both S-NSSAI based on the allowed NSSAI and the corresponding S-NSSAI based on the information on the mapped NSSAI. Here, the information on the mapped NSSAI is information on mapping of each S-NSSAI in the allowed NSSAI to the S-NASSI in the NSSAI set up for HPLMN.

More specifically, the UE may extract and store the allowed NSSAI and the information on the mapped NSSAI, included in the registration accept message received from the network (i.e., AMF) in the registration procedure shown in FIG. 5. Therefore, the UE may transmit by including both S-NSSAI based on the allowed NSSAI and the corresponding S-NSSAI based on the information on the mapped NSSAI in the PDU session establishment request message.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<Problem to be Solved through the Disclosure of the Present Specification>

As described above, a network system (i.e., 5GC) for next-generation mobile communication (i.e., 5G) also supports non-3GPP access. An example of the non-3GPP access representatively includes WLAN access. The WLAN access may include both a trusted WLAN and an untrusted WLAN.

In a system for 5G, the AMF performs registration management (RM) and connection management (CM) for non-3GPP access in addition to 3GPP access.

A conventional network system (i.e., EPC) for fourth generation mobile communication (i.e., LTE) enables a UE to periodically perform a tracking area update (TAU) procedure in order to manage reachability for a UE, that is, in order to check whether a signal can reach the UE. In preparation for a case where the signal cannot reach the UE because the UE does not contact a network even after a given time, the network first runs a first timer, for example, a mobile reachable timer at the same time when the UE enters an idle mode. When the first timer expires, the network runs a second timer, for example, an implicit detach timer. When the second timer expires, the network performed an operation of implicitly detaching the UE.

A network system for 5G manages reachability for a UE through 3GPP access similar to such a mechanism.

In contrast, a network for 5G does not separately manage reachability for a UE through non-3GPP access. That is, if the UE is in the idle mode for a given time or more through non-3GPP access, a network for 5G does not run the mobile reachable timer and immediately implicitly de-registers the UE. Specifically, the network does not run a separate periodic registration update timer (e.g., T3512) and runs only a non-3GPP de-registration timer at the same time when the UE enters the idle mode. A network node (e.g., AMF) also does not run the mobile reachable timer, and runs a non-3GPP implicit de-registration timer having a greater value than the non-3GPP de-registration timer of the UE.

Hereinafter, in a mobile communication system for 5G, a scheme for managing a periodic registration update timer and a reachability timer is described as follows.

In order to periodically notify a network of reachability (or availability) for a UE, a periodic registration update procedure is periodically performed through 3GPP access. The procedure is managed by a first timer operating within the UE, that is, a periodic registration update timer (e.g., T3512).

If the UE has performed registration through 3GPP access, the AMF manages a second timer, that is, an implicit de-registration timer, in order to manage when the UE will be implicitly de-registered through 3GPP access.

If the UE has performed registration through non-3GPP access, the AMF manages a third timer, that is, a non-3GPP implicit de-registration timer, in order to manage when the UE will be implicitly de-registered through non-3GPP access.

Likewise, the UE that has performed registration through the non-3GPP access runs a fourth timer, that is, a non-3GPP de-registration timer, in order to manage when the UE will be implicitly de-registered through non-3GPP access.

When an N1 NAS signaling connection is de-registered through non-3GPP access, the AMF starts the third timer, that is, the non-3GPP implicit de-registration timer, with respect to the UE registered through the non-3GPP access.

Likewise, the UE that has performed registration through the non-3GPP access also starts the fourth timer, that is, the non-3GPP de-registration timer, when the N1 NAS signaling connection through the non-3GPP access is de-registered. If the UE enters a connection mode (e.g., 5GMM-CONNECTED mode) through non-3GPP access or enters a de-registration mode (e.g., 5GMM-DEREGISTERED) through non-3GPP access, the fourth timer, that is, the non-3GPP de-registration timer may be stopped.

A value of the third timer, that is, the non-3GPP implicit de-registration timer, may be greater than a value of the fourth timer, that is, the non-3GPP de-registration timer.

A value of the first timer, that is, the periodic registration update timer (e.g., T3512), may be included in a REGISTRATION ACCEPT message transmitted by the network and may be transmitted to the UE.

The UE may apply the value in all tracking areas within a tracking area list assigned to the UE until a new value is received. The periodic registration update timer may be applied to only a UE that has been registered through 3GPP access.

If a REGISTRATION ACCEPT message including a value of the first timer, that is, the periodic registration update timer (e.g., T3512), includes indication indicating that the timer has been deactivated or the value is 0, the first timer, that is, the periodic registration update timer (e.g., T3512), is deactivated, and the UE does not perform a periodic registration update procedure.

If a mode of the UE changes from the connection mode (e.g., 5GMM-CONNECTED mode) through the 3GPP access to the idle mode (e.g., 5GMM-IDLE mode), the first timer, that is, the periodic registration update timer (e.g., T3512), is reset and starts at an initial value again.

If a mode of the UE changes into the connection mode (e.g., 5GMM-CONNECTED mode) through the 3GPP access or a de-registration state (e.g., 5GMM-DEREGISTERED state), the first timer, that is, the periodic registration update timer (e.g., T3512), may be stopped.

If the UE subscribes to an emergency service and the first timer, that is, the periodic registration update timer (e.g., T3512) expires, the UE does not initiate a periodic registration update procedure, and may implicitly perform de-registration from a network. If the UE camps on a proper cell, the UE may perform re-registration in order to receive common service again.

If the UE has not been registered with the emergency service and the first timer, that is, the periodic registration update timer (e.g., T3512) expires, a periodic registration update procedure is started.

The network may manage the periodic registration update procedure of the UE through the reachability timer (i.e., mobile reachable timer).

If the UE has not been registered with the emergency service, a value of the reachability timer needs to be greater than a value of the first timer, that is, the periodic registration update timer (e.g., T3512). In general, a value of the reachability timer may be set to be 4 minutes greater than a value of the first timer, that is, the periodic registration update timer (e.g., T3512).

When the reachability timer expires, the network stops transmitting a paging message to the UE.

If the UE has been registered with the emergency service, the AMF sets a value of the reachability timer to be identical with a value of the first timer, that is, the periodic registration update timer (e.g., T3512). When the reachability timer expires, the AMF implicitly de-registers the UE.

If the AMF de-registers an NAS signaling connection for the UE, the reachability timer may be reset and may start at the value described above. When an NAS signaling connection is established for the UE, the reachability timer may be stopped.

When the reachability timer expires, the network starts the implicit de-registration timer for 3GPP access. A value of the implicit de-registration timer for the 3GPP access is determined by the network. In general, a value of the implicit de-registration timer for the 3GPP access may be set to be 4 minutes greater than a value of the first timer, that is, the periodic registration update timer (e.g., T3512).

When the implicit de-registration timer expires before the UE contacts a network, the network implicitly de-registers the UE. When an NAS signaling connection is established for the UE before the implicit de-registration timer for the UE expires, the implicit de-registration timer is stopped.

When the third timer, that is, the non-3GPP implicit de-registration timer, expires before the UE contacts the network through non-3GPP access, the network implicitly de-registers the UE and enters the de-registration state (i.e., 5GMM-DEREGISTERED state) with respect to the non-3GPP access. If an NAS signaling connection is established for the UE through the non-3GPP access before the third timer, that is, the non-3GPP implicit de-registration timer expires, the third timer, that is, the non-3GPP implicit de-registration timer, may be stopped.

When the fourth timer, that is, the non-3GPP de-registration timer, expires before the UE contacts the network through non-3GPP access, the UE enters the de-registration state (i.e., 5GMM-DEREGISTERED state) with respect to the non-3GPP access. If an NAS signaling connection is established for the UE through the non-3GPP access before the fourth timer, that is, the non-3GPP de-registration timer expires, the fourth timer, that is, the non-3GPP de-registration timer, is stopped.

If the AMF provides a value of a back-off timer (e.g., T3346) through a mobility management message and the value of the back-off timer (e.g., T3346) is greater than a value of the first timer, that is, the periodic registration update timer (e.g., T3512), the AMF sets a value of the reachability timer and a value of the implicit de-registration timer so that the sum of the timer values is greater than the value of the back-off timer (e.g., T3346).

If the AMF provides a value of the back-off timer (e.g., T3346) through a mobility management message and the value of the back-off timer (e.g., T3346) is greater than a value of the fourth timer, that is, the non-3GPP de-registration timer, the AMF sets a value of the third timer, that is, the non-3GPP implicit de-registration timer, to be greater than the value of the back-off timer (e.g., T3346).

The value of the back-off timer (e.g., T3346 value) may be transmitted to the UE in a network congestion situation. Specifically, when a congestion situation occurs in a network, the network may apply MM congestion control through the AMF. For the congestion control, the network provides the UE with a reject message, including a cause value (cause #22) indicative of the congestion situation and a value of the back-off timer (e.g., T3346), in response to a mobility management request from the UE. Upon receiving the cause value and the value of the back-off timer (e.g., T3346), the UE runs the back-off timer (e.g., T3346). While the timer is running, most of the MM procedure is prohibited.

When a value of the back-off timer (e.g., T3346) is greater than a value of the first timer, that is, the periodic registration update timer (e.g., T3512), a network contact through a periodic registration update procedure of the UE may be delayed. When a value of the back-off timer (e.g., T3346) is greater than the sum of a value of the reachability timer and a value of the implicit de-registration timer, the network inevitably de-registers the UE. Due to this, problems in that unnecessary signaling occurs and a user experiences a service stop may occur.

In order to solve the above problems in 3GPP access, as described above, the AMF sets a value of the third timer, that is, the non-3GPP implicit de-registration timer, to be greater than a value of the back-off timer (e.g., T3346).

Furthermore, in order to solve the above problems in non-3GPP access, when a value of the fourth timer, that is, the non-3GPP de-registration timer, is greater than a value of the back-off timer (e.g., T3346), the AMF sets a value of the third timer, that is, the non-3GPP implicit de-registration timer, to be greater than the value of the back-off timer (e.g., T3346).

However, the above solutions have a fundamental problem.

Specifically, there is a fundamental difference between the first timer, that is, the periodic registration update timer (e.g., T3512) for 3GPP access, and the non-3GPP de-registration timer for non-3GPP access. Although the first timer, that is, the periodic registration update timer (e.g., T3512) expires, the UE maintains a registration state (5GMM-REGISTERED state). However, a problem may additionally occur because a network immediately implicitly de-registers the UE when the non-3GPP de-registration timer expires.

A reason why the problem occurs is described with reference to a process of setting a value of the non-3GPP implicit de-registration timer.

When a value of the back-off timer (e.g., T3346) is greater than a value of the fourth timer, that is, the non-3GPP de-registration timer, of the UE, the AMF set a value of its own third timer, that is, the non-3GPP implicit de-registration timer, to be greater than the back-off timer (e.g., T3346). However, this is meaningless when considering the following process.

1) The UE receives a value of the back-off timer (e.g., T3346) set to be greater than a value of the fourth timer, that is, the non-3GPP de-registration timer.

That is, a value of the T3346>a value of the non-3GPP de-registration timer

2) The AMF sets a value of the third timer, that is, the non-3GPP implicit de-registration timer, to be greater than a value of the back-off timer (e.g., T3346).

That is, a value of the non-3GPP implicit de-registration timer>a value of the T3346>a value of the non-3GPP de-registration timer 3) If the back-off timer (e.g., T3346) is running, the UE cannot transmit an MO signal through non-3GPP access. As a result, the fourth timer, that is, the non-3GPP de-registration timer, expires.

4) When the fourth timer, that is, the non-3GPP de-registration timer, expires, the UE transits to a de-registration state (i.e., 5-DEREGISTERED state) with respect to non-3GPP access.

5) Regardless of whether the third timer, that is, the non-3GPP implicit de-registration timer, of the AMF is greater than or smaller than the back-off timer (e.g., T3346), the AMF does not need to perform a separate operation in order to set a value of the third timer, that is, the non-3GPP implicit de-registration timer, because the UE has already been implicitly de-registered.

That is, the existing solution is intended to solve a problem in that a UE is unintentionally de-registered by running a back-off timer, but the problem is never solved and the AMF performs only an unnecessary operation. In particular, in a congestion situation, a problem in that only a load of the AMF is weighted is additionally caused. Furthermore, due to such a problem, service quality of the UE is degraded, and unnecessary signaling (the transmission and reception of signals attributable to a procedure for re-registration) occurs.

The Disclosure of the Present Specification

Accordingly, the disclosure of the present specification has an object of proposing a scheme for preventing a UE, registered through non-3GPP access, from being unnecessarily de-registered in a next-generation mobile communication system (i.e., 5G system).

I. First Disclosure: Setting of Timer Value of AMF

FIG. 7 is an exemplary diagram illustrating a flowchart according to a first disclosure.

As illustrated in FIG. 7, an AMF 410 may transmit a value of the fourth timer, that is, the non-3GPP de-registration timer, to a UE through a registration procedure. Or the UE 100 may use a default value for the fourth timer, that is, the non-3GPP de-registration timer. If the AMF does not transmit a value of the timer, the UE may use a previously stored value or may use a preset default value (e.g., 54 minutes).

If the AMF performs a back-off operation due to a congestion situation of the AMF, the AMF operates as follows.

If the AMF is aware of a value of the fourth timer, that is, the non-3GPP de-registration timer, previously assigned to the UE, the AMF may set the back-off timer (e.g., T3346) to have a value smaller than a value of the fourth timer, that is, the non-3GPP de-registration timer, and may transmit the value of the back-off timer to the UE.

That is, a value of the T3346<a value of the non-3GPP de-registration timer

If the UE has been registered with both 3GPP access and non-3GPP access and the two accesses belong to the same PLMN (i.e., if the two accesses are managed by one AMF), the AMF determines a value of the back-off timer (e.g., T3346) as follows.

A value of the T3346<min [a value of the non-3GPP de-registration timer (a value of the reachability timer+a value of the implicit de-registration timer)]

If the AMF is unaware of or has not stored a value of the fourth timer, that is, the non-3GPP de-registration timer, assigned to the UE, the AMF performs setting according to Section 1-1 or 1-2 below.

I-1. First scheme of the first disclosure: simultaneously transmit values of the back-off timer (e.g., T3346) and the non-3GPP de-registration timer After the UE performs registration through non-3GPP access according to an initial registration procedure, the UE may receive a reject message, including a value of the back-off timer (e.g., T3346), while performing a service request procedure and a mobility registration procedure.

Figure 8:
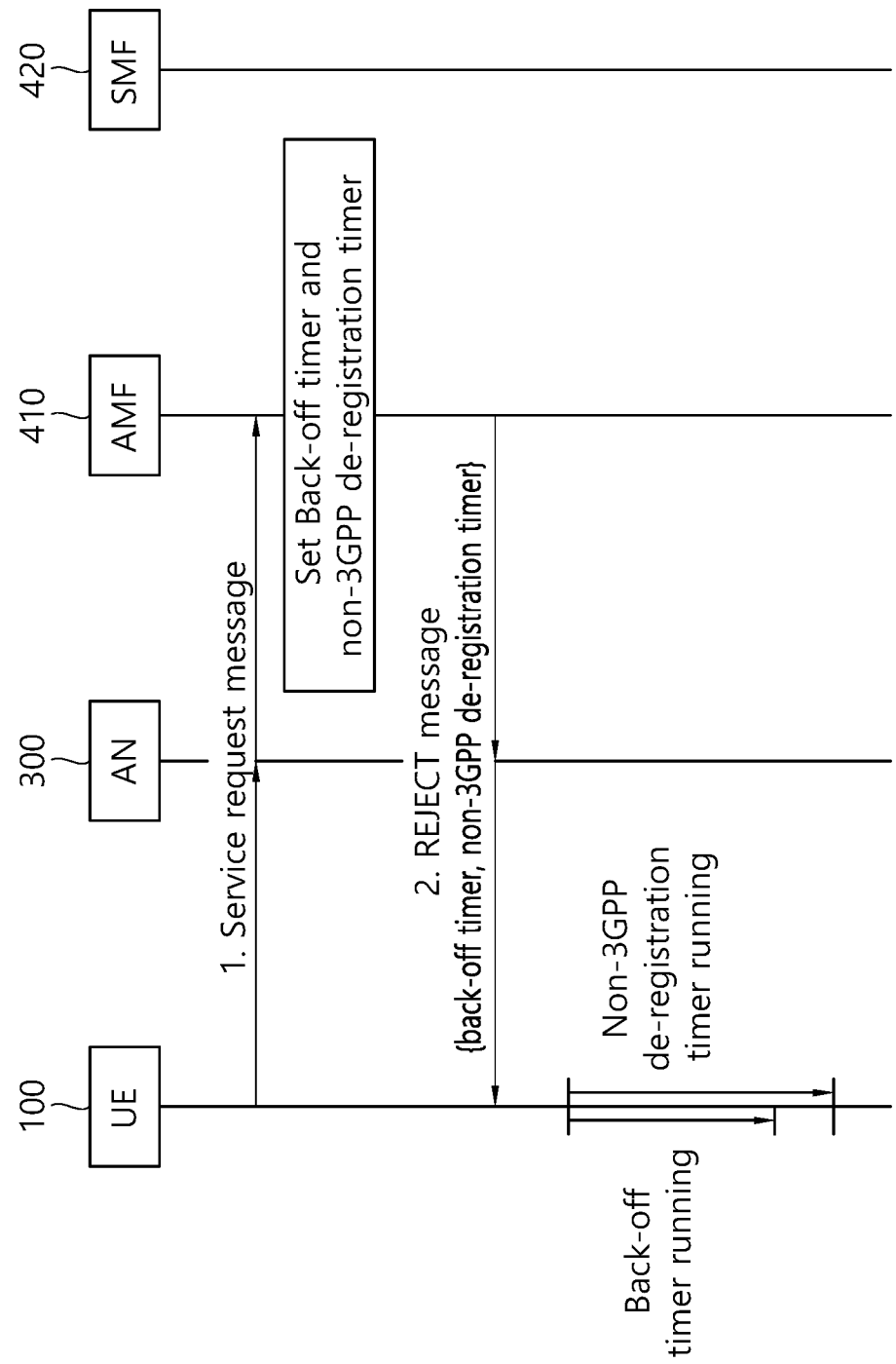
FIG. 8 is an exemplary diagram illustrating a flowchart according to the first scheme of the first disclosure.

FIG. 8 is an exemplary diagram illustrating a flowchart according to the first scheme of the first disclosure.

Referring to FIG. 8, when the AMF 410 transmits a reject message in response to a service request message of the UE 100, the AMF 410 may transmit the reject message including a new value of the fourth timer, that is, the non-3GPP de-registration timer to be used by the UE 100 as well as a value of the back-off timer (e.g., T3346).

At this time, the AMF may transmit, to the UE, a value that satisfies a condition of a value of the back-off timer (e.g., T3346)<a value of the fourth timer, that is, the non-3GPP de-registration timer. If a default value is used, a value of the fourth timer, that is, the non-3GPP de-registration timer, is 54 minutes. Accordingly, a value of the back-off timer (e.g., T3346) of about 50 minutes short of 4 minutes may be assigned.

If a value of the timer is transmitted through a service reject message, a format of the service reject message may be as follows.

TABLE 1

| Service reject message | Length |
| --- | --- |
| Value of T3346 | 3 |
| Value of non-3gpp de-registration timer | 3 |

A value of the fourth timer, that is, the non-3GPP de-registration timer, within the service reject message may be greater than a value of the back-off timer (e.g., T3346). For example, a value of the fourth timer, that is, the non-3GPP de-registration timer, may be set to be greater than a value of the back-off timer (e.g., T3346) by 4 minutes.

If a value of the timer is transmitted through a registration reject message, a format of the registration reject message may be as follows.

TABLE 2

| Registration REJECT message | Length |
| --- | --- |
| Value of T3346 | 3 |
| Value of non-3GPP de-registration timer | 3 |

A value of the fourth timer, that is, the non-3GPP de-registration timer, within the registration reject message may be greater than a value of the back-off timer (e.g., T3346). For example, a value of the fourth timer, that is, the non-3GPP de-registration timer, may be set to be greater than a value of the back-off timer (e.g., T3346 timer) by 4 minutes.

I-2. Second scheme of the first disclosure: a value of the T3346 is not transmitted, and only a value of the non-3GPP de-registration timer is transmitted A network may transmit, to a UE, a value of the back-off timer (e.g., T3346) along with a cause value (e.g., #22) for a back-off operation. However, this is optional, and a value of the timer may not be transmitted.

If a value of the timer is not transmitted, the UE 100 may select a random value within a range of 15 minutes to 30 minutes, and may operate a back-off timer.

Figure 9:
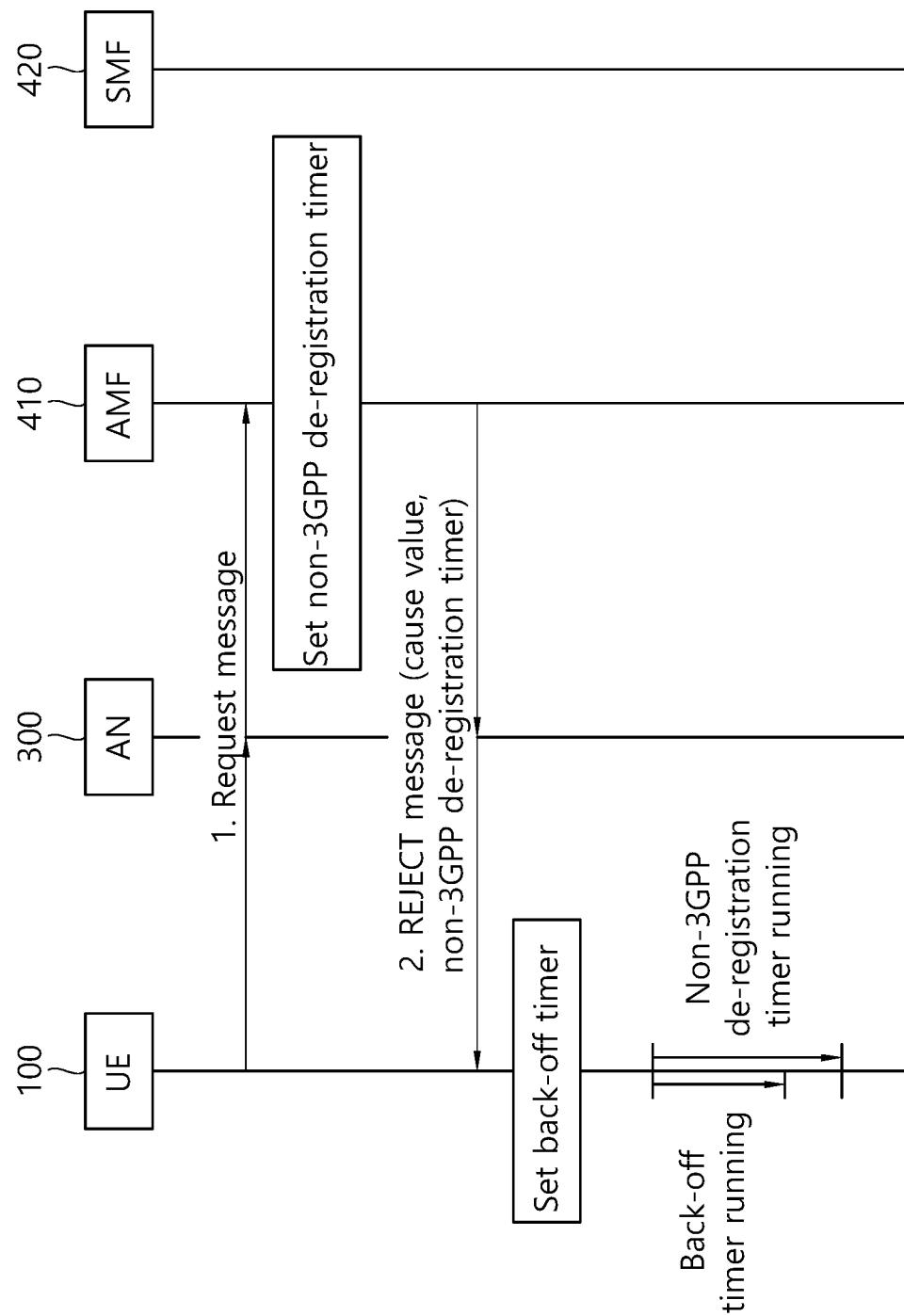
FIG. 9 is an exemplary diagram illustrating a flowchart according to the second scheme of the first disclosure.

FIG. 9 is an exemplary diagram illustrating a flowchart according to the second scheme of the first disclosure.

As may be seen with reference to FIG. 9, when the AMF 410 transmits a reject message including a cause value, the AMF may set only a value of the fourth timer, that is, the non-3GPP de-registration timer. Furthermore, the AMF 410 may transmit the reject message, including the cause value and a value of the fourth timer, that is, the non-3GPP de-registration timer.

If a value of the back-off timer (e.g., T3346) is not transmitted, the UE 100 may select a random value within a range of 15 minutes to 30 minutes and operate a back-off timer.

At this time, the value of the fourth timer, that is, the non-3GPP de-registration timer, need to be at least 30 minutes or more. In general, the value of the fourth timer may be set to 34 minutes which is 4 minutes greater than a maximum value of the back-off timer.

I-3. Third scheme of the first disclosure: when a value of the non-3GPP de-registration timer operates as a default value If a UE sets a value of the fourth timer, that is, the non-3GPP de-registration timer, as a default value and operates, a network may set a value of the back-off timer (e.g., T3346) to 50 minutes or less and transmit the value, without a need to separately set a value of the fourth timer, that is, the non-3GPP de-registration timer.

Figure 10:
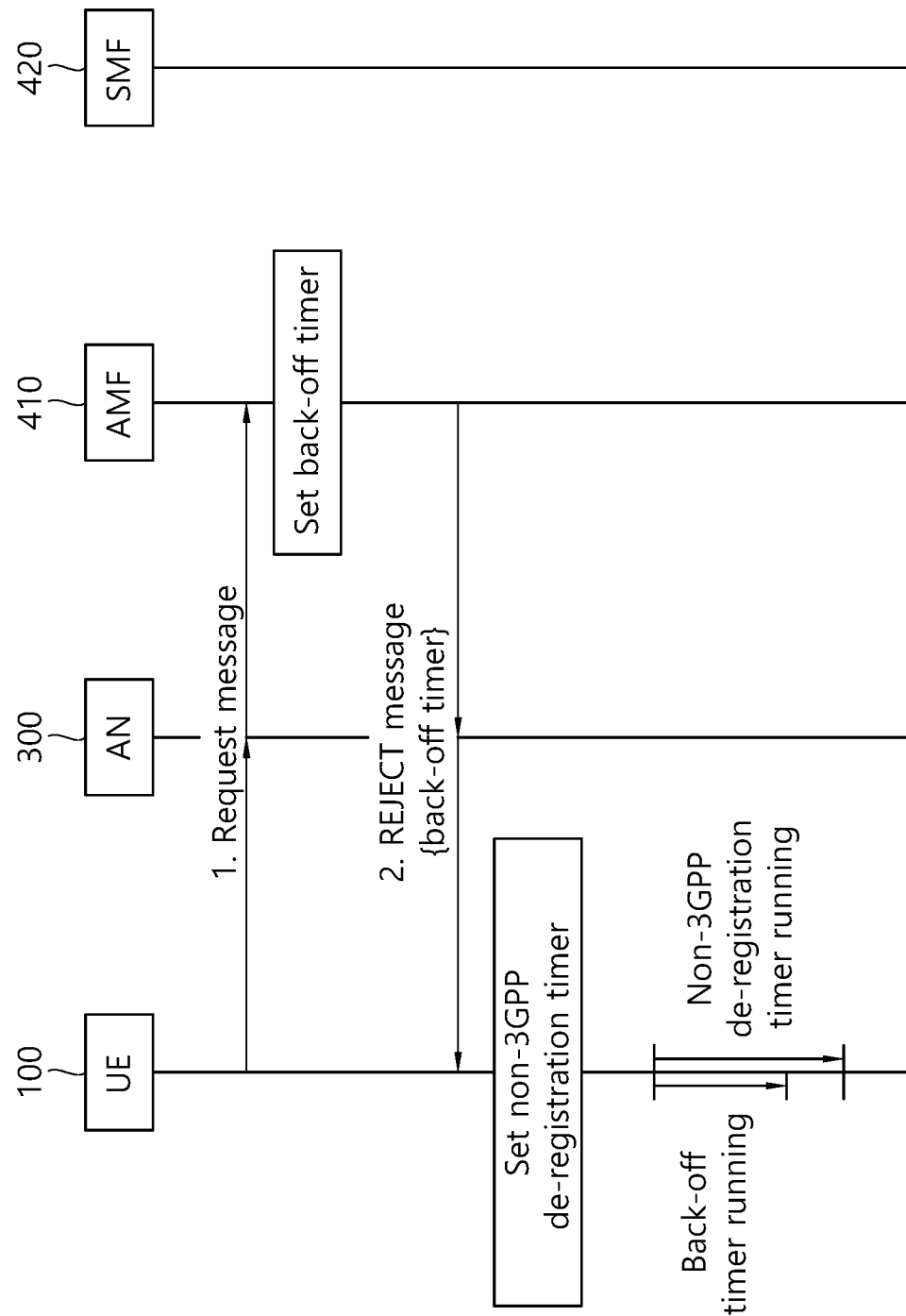
FIG. 10 is an exemplary diagram illustrating a flowchart according to the third scheme of the first disclosure.

FIG. 10 is an exemplary diagram illustrating a flowchart according to the third scheme of the first disclosure.

As may be seen with reference to FIG. 10, the AMF 410 may set only a value of the back-off timer (e.g., T3346) and then transmit a reject message, including the set value of the back-off timer (e.g., T3346) and a cause value.

After receiving only the value of the back-off timer (e.g., T3346), the UE 100 may set a value of the non-3GPP de-registration timer.

The UE may set a value of the fourth timer, that is, the non-3GPP de-registration timer, as a default value, and may operate. In this case, the default value for the fourth timer, that is, the non-3GPP de-registration timer, may be greater than the value of the back-off timer (e.g., T3346). For example, the value of the fourth timer, that is, the non-3GPP de-registration timer, may be set to be 4 minutes greater than a maximum value of the back-off timer.

Alternatively, the AMF 410 may not transmit the back-off timer (e.g., T3346). In this case, the UE 100 may select a random value within a range of 15 minutes to 30 minutes, that is, a default operation value, and may run the back-off timer (e.g., T3346). In this case, a value of the fourth timer, that is, the non-3GPP de-registration timer, may be set to be 4 minutes greater than a value of the back-off timer.

II. Brief Summary of a Disclosure of the Present Disclosure

When the AMF 410 attempts to transmit a mobility management message including a back-off timer (e.g., T3346), if the UE performs registration through non-3GPP access, the AMF 410 may set a value of the back-off timer (e.g., T3346) to be smaller than a value of the third timer, that is, the non-3GPP implicit de-registration timer.

A value of the back-off timer (e.g., T3346) may be set to be 4 minutes smaller than a value of the fourth timer, that is, the non-3GPP de-registration timer.

An aspect of the present specification is summarized as follows. The UE may receive a reject message including a value of the back-off timer. Furthermore, the UE may determine a value of the non-3GPP de-registration timer based on the value of the back-off timer. In this case, the value of the non-3GPP de-registration timer may be determined to be greater than the value of the back-off timer.

The value of the non-3GPP de-registration timer may be determined to be 4 minutes greater than the value of the back-off timer.

The reject message may include one or more of a registration reject message and a service reject message.

The non-3GPP de-registration timer may run based on the determined value.

When a signaling connection is de-registered on the non-3GPP access, the non-3GPP de-registration timer may run.

The value of the non-3GPP de-registration timer may be set to be smaller than a value of the non-3GPP implicit de-registration timer driven by an AMF node.

The value of the non-3GPP de-registration timer may be set to be greater than the value of the back-off timer.

The back-off timer may be used for congestion control.

The back-off timer may be a T3346.

III. Usage Example of a Disclosure of the Present Specification

An example in which a disclosure of the present specification may be used is described as follows.

<General apparatus to which a disclosure of the present specification may be applied>

Hereinafter, an apparatus to which a disclosure of the present specification may be applied is described.

Figure 11:
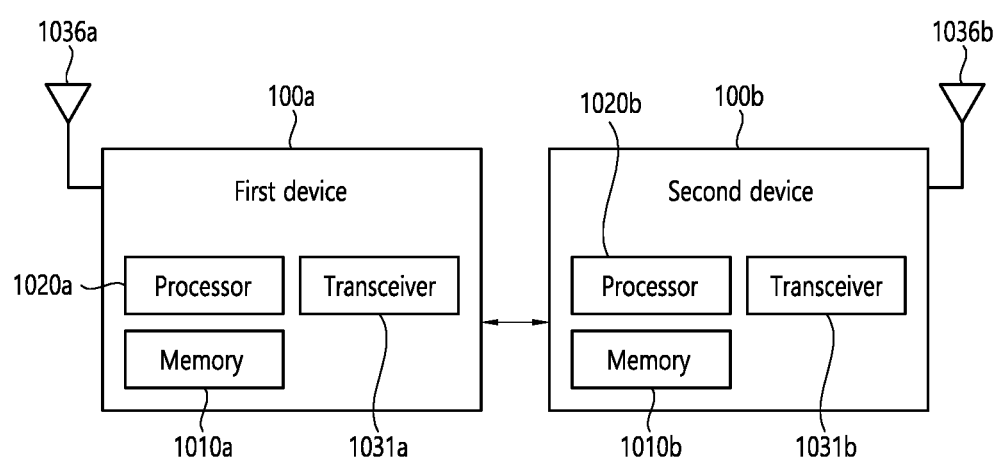
FIG. 11 illustrates a wireless communication system according to an embodiment.

FIG. 11 illustrates a wireless communication system according to an embodiment.

Referring to FIG. 11, the wireless communication system may include a first device 100*a* and a second device 100*b*.

The first device 100*a* may be a device related to a base station, a network node, a transmission terminal, a reception terminal, a wireless device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100*b* may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a personal digital assistants (PDA), a portable multimedia player (PMP), a navigation, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 12:
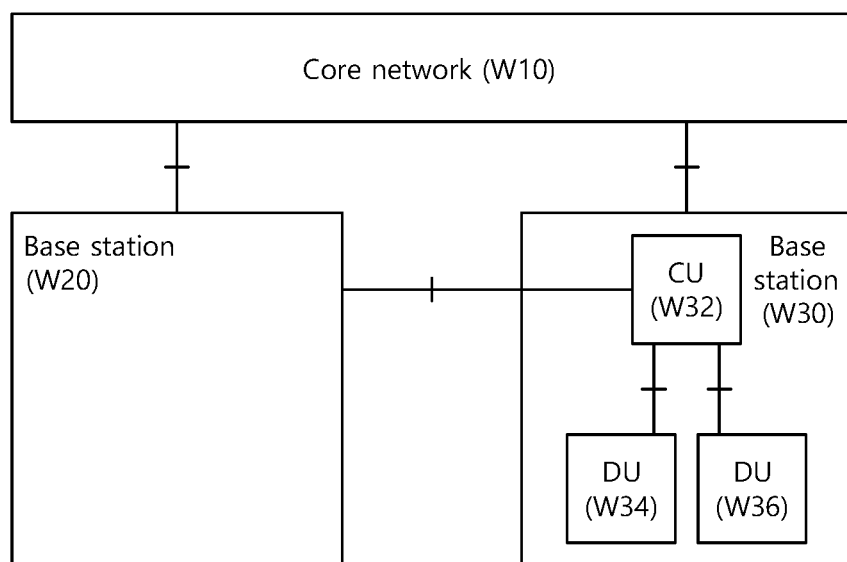
FIG. 12 illustrates a block diagram of a network node according to an embodiment.

FIG. 12 illustrates a block diagram of a network node according to an embodiment.

In particular, FIG. 12 is a diagram more specifically illustrating a network node if a base station is divided into a central unit (CU) and a distributed unit (DU).

Referring to FIG. 12, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts radio resource control (RRC), service data adaptation protocol (SDAP) and packet data convergence protocol (PDCP) layers of the base station (e.g., gNB). The DU W34, W36 may be a logical node that hosts radio link control (RLC), media access control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 13:
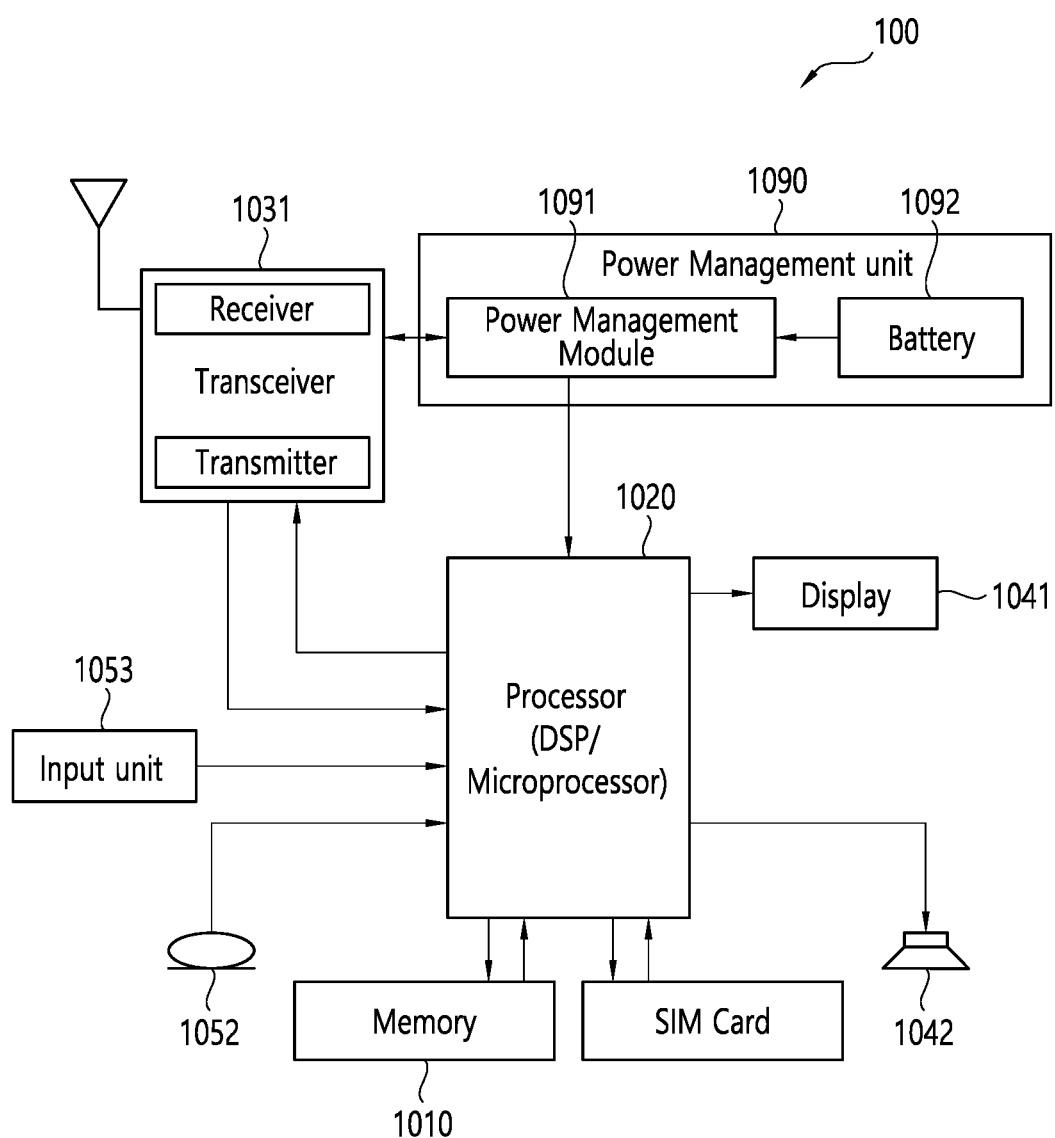
FIG. 13 is a block diagram of a UE according to an embodiment of the present disclosure.

FIG. 13 is a block diagram of a UE according to an embodiment of the present disclosure.

A UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

VI. Scenarios to which the Disclosure of the Present Disclosure is Applicable Hereinafter, scenarios to which the present disclosure is applicable are described.

In the present disclosure, an always-on PDU session for URLLC having a low-latency characteristic may be used for artificial intelligence, robots, autonomous driving, extended reality, and the like among the 5G scenarios below.

<5G use Scenarios>

Figure 14:
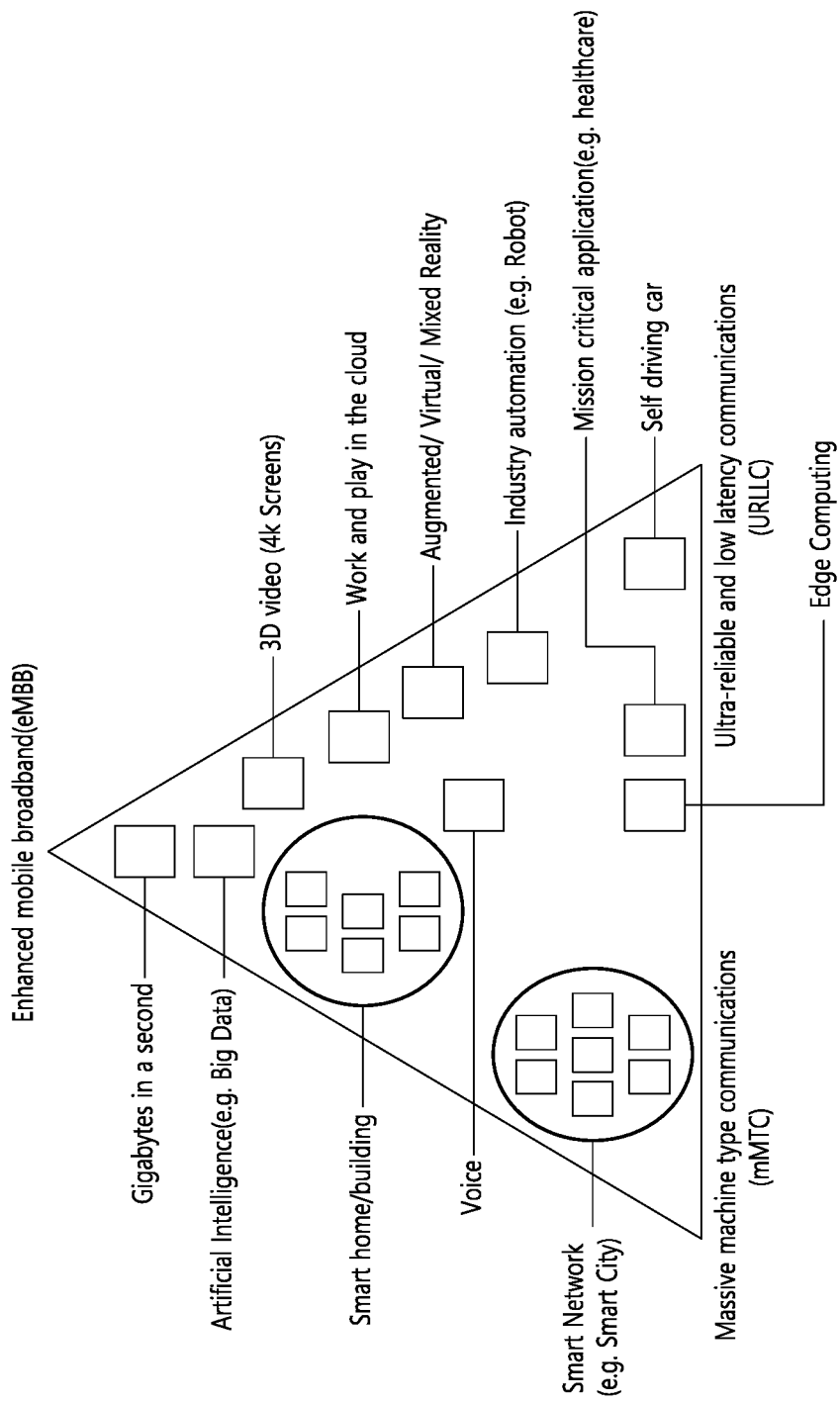
FIG. 14 illustrates an example of 5G use scenarios.

FIG. 14 illustrates an example of 5G use scenarios.

The 5G usage scenarios illustrated in FIG. 14 are merely exemplary, and the technical features of the present disclosure may also be applied to other 5G usage scenarios that are not illustrated in FIG. 14.

Referring to FIG. 14, three major requirement areas of 5G include: (1) an enhanced mobile broadband (eMBB) area, (2) a massive machine type communication (mMTC) area, and (3) an ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are another key factor requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per km². The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 14 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver TVs with resolution of 4K or higher (6K, 8K and higher) as well as virtual reality (VR) and augmented reality (AR). VR and AR applications involve almost immersive sports events. Specific applications may require special network configuration. For example, in the case of VR games, a game company may need to integrate a core server with an edge network server of a network operator to minimize latency.

Automotive is expected to be an important new driver for 5G together with many use cases for mobile communication regarding vehicles. For example, entertainment for passengers require both high capacity and high mobile broadband. The reason is because future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health Sector has many Applications that may Benefit from Mobile Communications.

The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value <Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to virtual reality (VR), augmented reality (AR), and mixed reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

Figure 15:
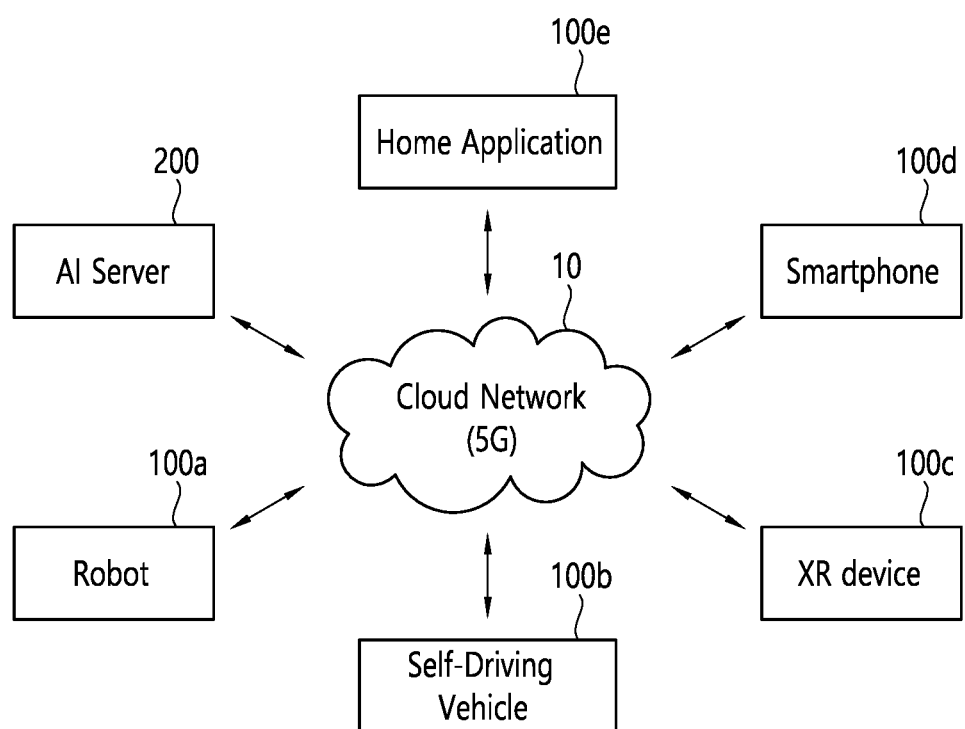
FIG. 15 shows an AI system 1 according to an embodiment.

FIG. 15 shows an AI system 1 according to an embodiment.

Referring to FIG. 15, an AI system 1 is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may be a network that constitutes a part of a cloud computing infrastructure or a network that exists in the cloud computing infrastructure. Here, the cloud network 10 may be configured using a 3G network, a 4G or long term evolution (LTE) network, or a 5G network.

The devices 100a to 100e and 200 configuring the AI system 1 may be interconnected over the cloud network. Particularly, the devices 100a to 100e and 200 may communicate with each other through a base station but may directly communicate with each other without the intervention of a base station.

The AI server 200 may include a server that performs AI processing and a server that performs an operation on big data.

The AI server 200 is connected to at least one of the robot 100a, the self-driving vehicle 100b, the XR device 100c, the smartphone 100d or the home appliances 100e, that is, AI devices configuring the AI system, over the cloud network 10 and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

Hereinafter, various embodiments of the AI devices 100a to 100e to which the aforementioned technology is applied will be described.

<AI+Robot>

The robot 100a, which adopts an AI technology, may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implemented with hardware.

The robot 100a may acquire status information of the robot 100a using sensor information acquired from various types of sensors, detect (recognize) surrounding environments and objects, generate map data, determine moving routes and driving plans, determine responses to user interactions, or determine actions.

Here, the robot 100a may use sensor information obtained from at least one sensor from among lidar, radar, and camera to determine a moving route and a driving plan.

The robot 100a may perform the above operations using a learning model including at least one artificial neural network. For example, the robot 100a may recognize a surrounding environment and an object using a learning model and may determine an operation using the recognized surrounding environment information or object information. Here, the learning model may be directly learned by the robot 100a or learned by an external device such as the AI server 200.

Here, the robot 100a may directly generate a result using a learning model and perform an operation, or transmit sensor information to an external device such as the AI server 200, receive a result generated accordingly, and perform an operation.

The robot 100a may determine a moving path and a driving plan using at least one of map data, object information detected from sensor information, or object information acquired from an external device, and control a driving unit to drive the robot 100a according to the moving path and the driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, a type, a distance, and a location.

In addition, the robot 100a may perform an operation or run by controlling the driving unit based on the user's control/interaction. In this case, the robot 100a may acquire interaction intention information according to a user's motion or voice speech, determine a response based on the acquired intention information, and perform an operation.

<Combination of AI, robot, Autonomous Driving, and XR>

The autonomous vehicle 100b may be implemented as a mobile robot, vehicle, or unmanned aerial vehicle by applying AI technology.

The XR device 100c may be implemented as a head-mounted display (HMD), a head-up display (HUD) provided in a vehicle, a TV, a mobile phone, a smartphone, a computer, a wearable device, a home appliance, a digital signage, a vehicle, a fixed robot or a moving robot, etc, by applying the AI technology, The robot 100a may be implemented as a guide robot, a transport robot, a cleaning robot, a wearable robot, an entertainment robot, a pet robot, an unmanned flying robot, etc., by applying the AI technology and an autonomous driving technology.

The robot 100a may be implemented as a guide robot, a transport robot, a cleaning robot, a wearable robot, an entertainment robot, a pet robot, an unmanned flying robot, a drone, etc., by applying the AI technology and an XR technology.

The autonomous vehicle 100b may be implemented as a mobile robot, a vehicle, or an unmanned vehicle by applying the AI technology and the XR technology.

Although the preferred embodiments of the present disclosure have been illustrated, the scope of the present disclosure is not limited to only such specific embodiments, and the present disclosure may be modified, changed or improved in various forms.

What is claimed is:

1. A method performed by a user equipment which has performed a registration in a non-3rd generation partnership project (3GPP) access, the method comprising:
   receiving a registration reject message including a timer value from an Access and Mobility management Function (AMF) node;
   setting a value of a non-3GPP de-registration timer to be 4 minutes greater than the timer value; and
   starting or resetting the non-3GPP de-registration timer based on a signaling connection over the non-3GPP access being released,
   wherein the value of the non-3GPP de-registration timer is less than a value of a non-3GPP implicit de-registration timer, and
   wherein the non-3GPP implicit de-registration timer is started by the AMF node.

2. The method of claim 1, wherein the value of the non-3GPP de-registration timer is set to be greater than the timer value.

3. The method of claim 1, wherein the timer value is for a back-off timer.

4. The method of claim 3, wherein the back-off timer is used for congestion control.

5. The method of claim 3, wherein the back-off timer is a T3346 timer.

6. A user equipment (UE) which has performed a registration in a non-3rd generation partnership project (3GPP) access, the UE comprising:
   a transceiver and a processor,
   wherein the processor is configured to:
   control the transceiver to receive a registration reject message including a timer value from an Access and Mobility management Function (AMF) node;
   set a value of a non-3GPP de-registration timer to be 4 minutes greater than the timer value;
   start or reset the non-3GPP de-registration timer based on a signaling connection over the non-3GPP access being released,
   wherein the value of the non-3GPP de-registration timer is less than a value of a non-3GPP implicit de-registration timer, and
   wherein the non-3GPP implicit de-registration timer is started by the AMF node.

7. The UE of claim 6, wherein the value of the non-3GPP de-registration timer is set to be greater than the timer value.

8. The UE of claim 6, wherein the timer value is for a back-off timer.

9. The UE of claim 8, wherein the back-off timer is used for congestion control.

10. The UE of claim 8, wherein the back-off timer is a T3346 timer.

11. A method performed by an Access and Mobility management Function (AMF) node for a registration in a non-3rd generation partnership project (3GPP) access, the method comprising:
    transmitting a registration reject message including a timer value to a user equipment (UE); and
    starting a non-3GPP implicit de-registration timer for the UE,
    wherein a value of a non-3GPP de-registration timer of the UE is set to be 4 minutes greater than the timer value,
    wherein the non-3GPP de-registration timer is started or reset by the UE based on a signaling connection over the non-3GPP access being released, and
    wherein the value of the non-3GPP de-registration timer is less than a value of the non-3GPP implicit de-registration timer.

12. The UE of claim 11, wherein the value of the non-3GPP de-registration timer is set to be greater than the timer value.

13. The UE of claim 11, wherein the timer value is for a back-off timer.

14. The UE of claim 13, wherein the back-off timer is used for congestion control.

15. The UE of claim 13, wherein the back-off timer is a T3346 timer.

* * * * *